United States Patent [19]

Enders

[11] Patent Number: 5,215,322

[45] Date of Patent: Jun. 1, 1993

[54] DUAL AND SINGLE SEAT COMPOSITE BICYCLE FRAMES AND FABRICATION METHODS THEREFORE

[76] Inventor: Mark L. Enders, 3253 N. 750 East, North Ogden, Utah 84404

[21] Appl. No.: 804,445

[22] Filed: Dec. 10, 1991

[51] Int. Cl.$^5$ .............................................. B62M 1/00
[52] U.S. Cl. ................... 280/231; 280/273; 280/274; 280/281.1; 280/288.1; 264/512
[58] Field of Search ............ 280/231, 273, 274, 281.1, 280/288.3; 264/512, 511

[56] References Cited

U.S. PATENT DOCUMENTS

| | | | |
|---|---|---|---|
| 4,657,795 | 4/1987 | Foret | 280/281.1 |
| 4,889,355 | 12/1989 | Trimble | 280/281.1 |
| 4,900,048 | 2/1990 | Derujinsky | 280/281.1 |
| 4,902,458 | 2/1990 | Trimble | 280/281.1 |
| 4,923,203 | 5/1990 | Trimble et al. | 280/281.1 |
| 5,011,172 | 4/1991 | Bellanca et al. | 280/288.3 |
| 5,013,514 | 5/1991 | Azzani et al. | 264/512 |
| 5,054,802 | 10/1991 | Smith | 280/281.1 |

FOREIGN PATENT DOCUMENTS 198284 10/1986 European Pat. Off. ......... 280/281.1

Primary Examiner—Margaret A. Focarino
Assistant Examiner—Kevin Hurley
Attorney, Agent, or Firm—A. Ray Osburn

[57] ABSTRACT

A generally hollow bicycle frame of resin impregnated fibrous material having a main tubular beam and cross tubular portions as required by single seat and dual seat bicycle frames. At the rearmost end of the main tubular beam is a cross tubular portion providing an upstanding seat support post and a downstanding pedal support post, and having a rearwardly and downwardly extending V-shaped rear wheel support member affixed to the seat support upwardly of the main tubular beam. For the dual seat frame, an additional cross tubular portion is provided intermediate the ends of the main beam, providing an upstanding front seat support and a downstanding front pedal support post. The frame is constructed of an innermost shell of fibrous material impregnated in synthetic resin and an outer layer of similar material. The junctions of the seat and pedal support post with the main tubular beam portion are strengthened by the main beam innermost shell extending continously, unbrokenly, through the junction. The innermost shells are constructed using male mandrels removed after vacuum bag cure of the shells. Subsequently, the innermost shell components are bonded together and overwrapped and overlaid with the outermost layer, serving thereafter as a mandrel for vacuum bag cure of the outermost layer, bonding it integrally to the innermost shells.

27 Claims, 8 Drawing Sheets

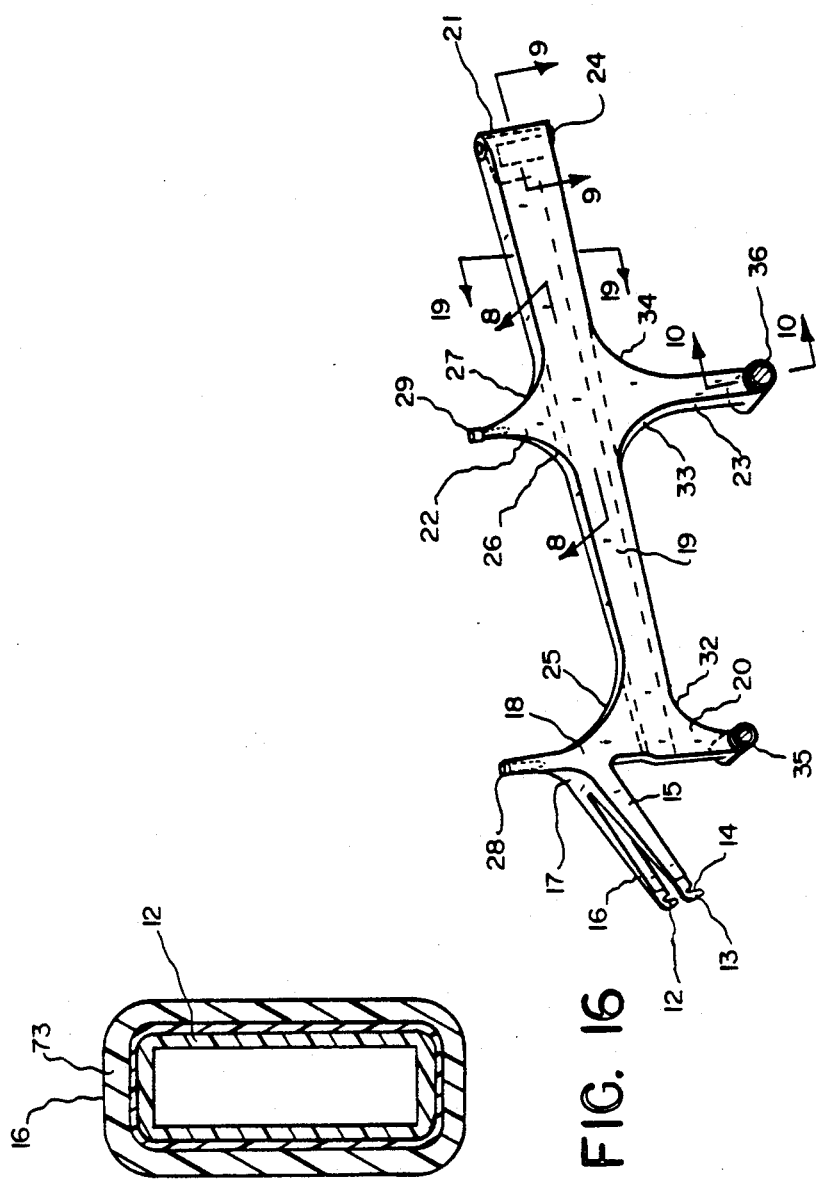
FIG. 2
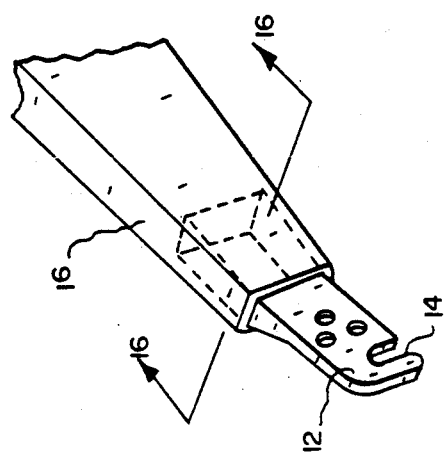
FIG. 16
FIG. 15

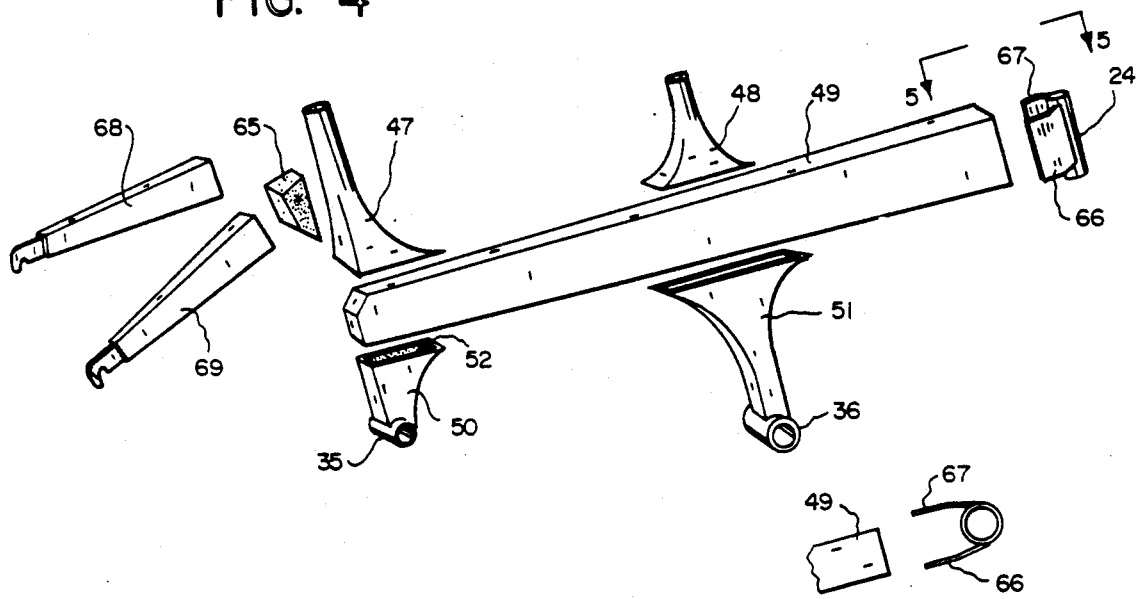
FIG. 4
FIG. 5
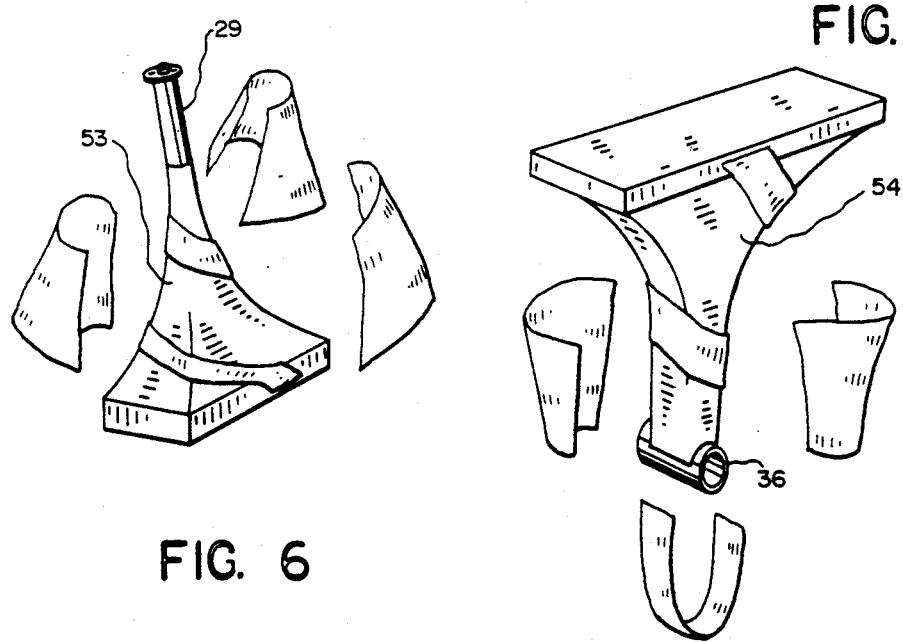
FIG. 6
FIG. 7

DUAL AND SINGLE SEAT COMPOSITE BICYCLE FRAMES AND FABRICATION METHODS THEREFORE

BACKGROUND OF THE INVENTION

1. Field

The present invention relates to bicycle frames constructed of composite materials, and to methods for making such frames. More particularly, the invention relates to generally hollow, single and tandem seat bicycle frames made from composite fibers impregnated with synthetic resins, and to methods for fabricating said frames.

2. State of the Art

Historically, two rider bicycles (tandem) have been constructed of variously sized metal tubes welded together to a desired frame geometry. This geometry is such as to fit the two riders' leg and torso lengths. The tandem frames currently produced require between 10 to 14 individual metal tubes arranged in a basic triangular truss pattern. Design of this conventional, triangular geometric tandem frame to fit particular pairs of riders requires individual selection of all of the triangular segment angles and tube lengths. Further, the resulting frames are usually quite heavy, to provide adequate axial and lateral stiffness to support the two riders, resulting in inefficient performance.

Single rider frame designs are inherently more simple, and constitute most current composite designs. In recent years, appropriately sized composite plastic tubes have been proposed to directly replace the metal tubes of conventional single rider bicycle frames. These composite frames include integral tube joints in place of the previously used welded metal joints, along with similarly constructed supports for the front fork and handlebar assemblies, the seat and the pedal and sprocket assembly. Branched rear wheel support stays are also of composite materials. These frames designs have continued to utilize conventional structural design concepts, replacing all the tubular metal members with composite plastic members designed to provide equivalent structural behavior. The frame structure disclosed in U.S. Pat. No. 4,900,048 perhaps best exemplifies this approach to design of a composite plastic, single seat bicycle frame. Other composite material design approaches include monocoque type frames with a unitary stress skin with internal stiffening ribs, disclosed in U.S. Pat. No. 4,513,986. In some designs, such monocoque frames have provided an outer skin held in place for strength by an innerfilling of foam, such as disclosed in U.S. Pat. No. 3,833,242.

These prior approaches to composite bicycle frames of fibrous materials and synthetic resin are capable of providing sufficient strength and rigidity to the single seat frames. However, they tend to be overly complex, requiring many tubes of differing shapes, and are also unnecessarily expensive because of multiple mold costs. This results from the substitution of anisotropic material into designs which have evolved from the use of isotropic metal tubes. The resulting frame complexity is felt in corresponding complexity and cost of associated exterior molds and the internal pressurizing bladders used to finally shape and cure the hollow frame components into final form.

A departure from the above approach for composite single seat bicycle frame design is found in U.S. Pat. No. 4,923,203, disclosing a design utilizing a single main tube downsloping to span from the head tube to the rear wheel hub, with a cross tube vertically intersecting the main tube to provide a seat support and a pedal support. This design has been designated the "X-frame" because of its shape. This patent also discloses the single tandem composite frame design known to applicant, and it is called the "X-X-frame". However, the disclosed composite structure designs for these frames, and the required method of fabrication, are unnecessarily complicated and expensive, whether for single or dual seat applications. Initially, uncured composite shells for the main tube and the cross tubes are constructed. Subsequently, flaps cut from the bottom and top of the main tube are bent to join sides of the upstanding and downstanding cross tube walls. The junction so formed must then be overwrapped by additional composite layers to provide a unified hollow construction. The uncured frame is then molded in an expensive three-part split female mold using internal pressure provided by a system of internal inflatable bladders.

Clearly, improved composite plastic fiber bicycle frame designs, and methods of fabrication therefor, remain critically needed, especially for dual seat frame applications, that are both structurally satisfactory and economically attractive.

SUMMARY OF THE INVENTION

With the foregoing in mind, the present invention eliminates or substantially alleviates the shortcomings of prior art composite material dual and single seat bicycle frames and methods for making such frames. The inventive dual seat frame is for convenience referred to as a "Z-X-frame", reflecting the appearance of its basic geometry. A hollow main beam spans between rear seat and rear pedal supports and a front fork and handlebar retaining head tube. Hollow seat support posts upstand from the rear and center portions of the main beam, each opposed by a hollow downstanding pedal hub support. A rear wheel stay in a split "V" configuration joins the rear seat post upwardly of the rear end of the main beam, and angles down rearwardly to connect the rear wheel axle. The main beam is preferably proportioned to provide a deep vertical crosssection to resist the increased bending stress resulting from the increased length of tandem designs.

For both dual and single seat designs, substantially hollow junctions connect the upstanding seat support post and the opposing pedal hub support to the main beam. The hollow junctions are, however, internally braced for strength and stability. Utilization of the improved stabilized junctions is made possible by the associated inventive method of construction of the frame. Briefly, innershells of cured composite materials are constructed, using male mandrels, for main beam, seat post and pedal hub supports, and the shells subsequently bonded together to provide a complete frame innershell assembly, which is then everywhere overwrapped with additional composite material, to be ultimately cured using an external vacuum bag technique. The use of the latter cure method allows the main beam innershell to brace, strengthen, and stabilize the junction by extending continuously therethrough.

The frames are made in two major steps. In the first, inner composite shells of main beam, seat and pedal hub supports and rear wheel stays are laid up, cured, and removed from appropriate male mandrels. In the second, the innershells are assembled by bonding, overwrapped with additional composite materials, and cured to produce a generally hollow unitary frame. Thus, the designer may select tubular geometries and sizes to provide desired stiffnesses by selection of appropriate male mandrel geometries and sizes. In contrast, conventional straight tubular frame components are limited to available cross sections and consequently offer only limited choices of stiffnesses.

The unitary frame assemblies are preferably made of a woven fibrous material or unidirectional tape which is impregnated with a synthetic thermosetting resin. Strips and patches are cut from a continuous roll to span or cover the innershells, including the full length main beam shell. This provides continuous stress-resisting paths at the junctions of the shells. The strips and patches are placed to exploit the anisotropic properties of the composite material. The resulting highly interspersed composite laminations transfer internal stresses, providing the desired compliance, lateral stiffness and torsional rigidity at each desired frame location.

The composite lay-up can be varied based on the selected materials and the selected tube geometry. In general, the number of plyes of preferably unidirectional tape will vary with the desired fiber orientations and the resulting section moduli of the various portions of the hollow unitary frame. Alterations in tube outer diameter and geometry can be made to produce a high section modulus which in turn can reduce the number of plyes and weight required in the lamination. Preferably, the ply orientation of the lamina will be highly interspersed to reduce residual stresses within the lamina. The orientation of the fibers of the ply will depend upon the stress field at various locations on the frame. The composite lamina design can be readily analyzed with available commercial composite supportive finite element analysis software.

In particular, the main beam composite tube will be first constructed as a shell with substantial thickness and rigidity to support seat posts bonded thereon, pedal support tubes, head tubes and rear wheel stay tubes, and also to withstand deflection during the vacuum bag curing process later discussed. The innershell lay-up may consist of eight plyes of unidirectional tape in a $[+60, 90, -60, 0]_s$ lay-up. The subsequent outer shell of the main tube lay-up is then tailored with both long and short lengths of tape to reinforce the joint areas as required. The lay-up of the main tube between the seat and pedal post positions may total 13 plyes.

The composite "Z-X-frame" is preferably made up of tubular portions united to form a unitary structure of cured composite material. A thick, continuous main beam shell is constructed by wrapping composite material upon an elongate mandrel. Tube rolling methods of manufacture may be used as described in Volume 1 of Engineered Materials Handbook, ASM Page 569, 1987. Other manufacturing methods such as filament winding, braiding or fiber placement may also be employed to make the innershells of fibrous synthetic resin composite material. A pair of rear wheel stay shells are similarly constructed using removable elongate mandrels.

Preferably, the first shells of the seat posts and pedal hub supports are layed up by hand using die cut patterns of unidirectional tape, in a manner well known in the art. All innershells are cured using a vacuum bag technique and heat applied as required by the resin used. Mandrels are removed and resulting shells are trimmed and butt-bonded in appropriate positions upon the upper and lower faces of the cured main beam shell.

The two arms of the split "V" rear wheel stays are similarly constructed in shell form as indicated above, but are adhesively bonded, preferably directly to the rear seat post, with a lightweight foam mandrel used to fill the space between the forward ends of the arms. This mandrel is not removed and is subsequently overwrapped.

The lightweight foam mandrels for the "V" joint are of low density, heat resistant, urethane foam. The urethane foam is easily carved to the required shape to fill large gaps between the rear stays and the rear seat support. The retained foam mandrel does not add significantly to the frame weight.

Wrapped and integrally bonded into a composite material of each rear wheel stay is a metallic rear wheel engaging plate. Similarly, metal tubes are incorporated into the seat post and the pedal supports, to ultimately accept seat spindles and pedal axle and bearing assemblies. Metal flanges are welded to a steering head tube with the metal flanges fitting tightly over the main tube innershell. The flanges are bonded thereto and overwrapped with the outer layers.

The innershell of the frame so assembled is then overwrapped with additional composite layers, resulting in a unified integral structure. Preferably, unidirectional tape composed of resin coated, longitudinal fibers is used, to provide continuous stress-resisting paths at the junctions of the main tube and appended shells. The seat post and pedal supports are generously filleted for reduced stress concentrations and for increased stiffness. Unidirectional tape patches (laminated into the junction areas and spanning the adjacent appended shells) produce an integral structure for transfer of loads subjected to the frame.

The uncured second, outermost, shell is then overwrapped with a disposable vacuum bag lay-up, familiar to those skilled in the art of composite materials. Alternately, a specialized, reuseable, silicon rubber vacuum bag may be used.

The vacuum bag applied correctly produces an inexpensive acceptably smooth outer surface finish, desirably free of any mold release contaminants typically required by internal-pressure-molded composites. These mold releases are compounds of fluorocarbons or silicon, applied to the interior cavities of female molds. These materials often transfer into the composites, and subsequently prevent bonding of paints, With vacuum bag curing, no internal pressurization bladders are used. Use of such bladders is difficult and unreliable. They are difficult to place within the complex molds for uniform pressurization, especially when two or more may be adjacent. Defective bladders, such as those which rupture when installed bent around sharp corners, result in air entrainment into the composite material of the frame. The frames are thus structurally defective and cannot be repaired. In contrast, leaking vacuum bags are easily detected, and accessible for replacement or repair without damage to the frame itself. Should increased external pressure be desired, cure could be accomplished within a pressurized autoclave, still using the vacuum bag.

It is also noted that bladders cannot be practically used within small rear wheel stay members so that expanding foam cores are necessarily used instead, remaining with the final composite frame. These cores add complexity to the process and weight to the finished frame.

The external bag, very importantly, obviates the necessity for expensive exterior, split, female curing molds substantially reducing tooling requirements. Thus, a variety of frame sizes may be economically feasible, which is especially important for tandem bicycle frames which must fit two individual riders.

The design of the "Z-X-frame" is such that families of completely different bicycles can be produced with the same basic method, using many of the same, or easily modified, components. The adaptability of the basic design is demonstrated in particular by the geometry of the rear portion of the "Z-X-frame". The basic components, including rear seat support, rear wheel stays, rear pedal support, and the rear junction of the main tube can, with minor adjustments, be made suitable for single seat bicycle frames. Further, minor fitting adjustment in the bonding of the first shell members can produce a single rider mountain bike frame, or even a racing frame. Also, the "Z-X-frame" can be produced in a version which would serve as a tandem mountain bicycle.

It is important to reiterate at this point that the internally braced junctions of the inventive composite frames would be virtually impossible to construct using internal bladder pressurization for final cure of the frame. The use of internal bladders dictates that the junctions be entirely of a single external shell without internal bracing, requiring the unbraced junction walls to carry all of the imposed loads with no buttressing or buckling stabilization. The stabilized junctions featured by the inventive frames provide for transfer of loads through the continuous wall of the main beam shell as well as through the resulting exterior unitary frame walls. The combination results in a junction of greater strength and greater torsional and lateral deflection stability.

It is therefore the principal object of the invention to provide improved bicycle frames of composite materials along with associated methods for their manufacture. It is a further objective to provide a design approach which may be utilized for both dual and single seat designs utilizing substantially identical manufacturing methods and tooling.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
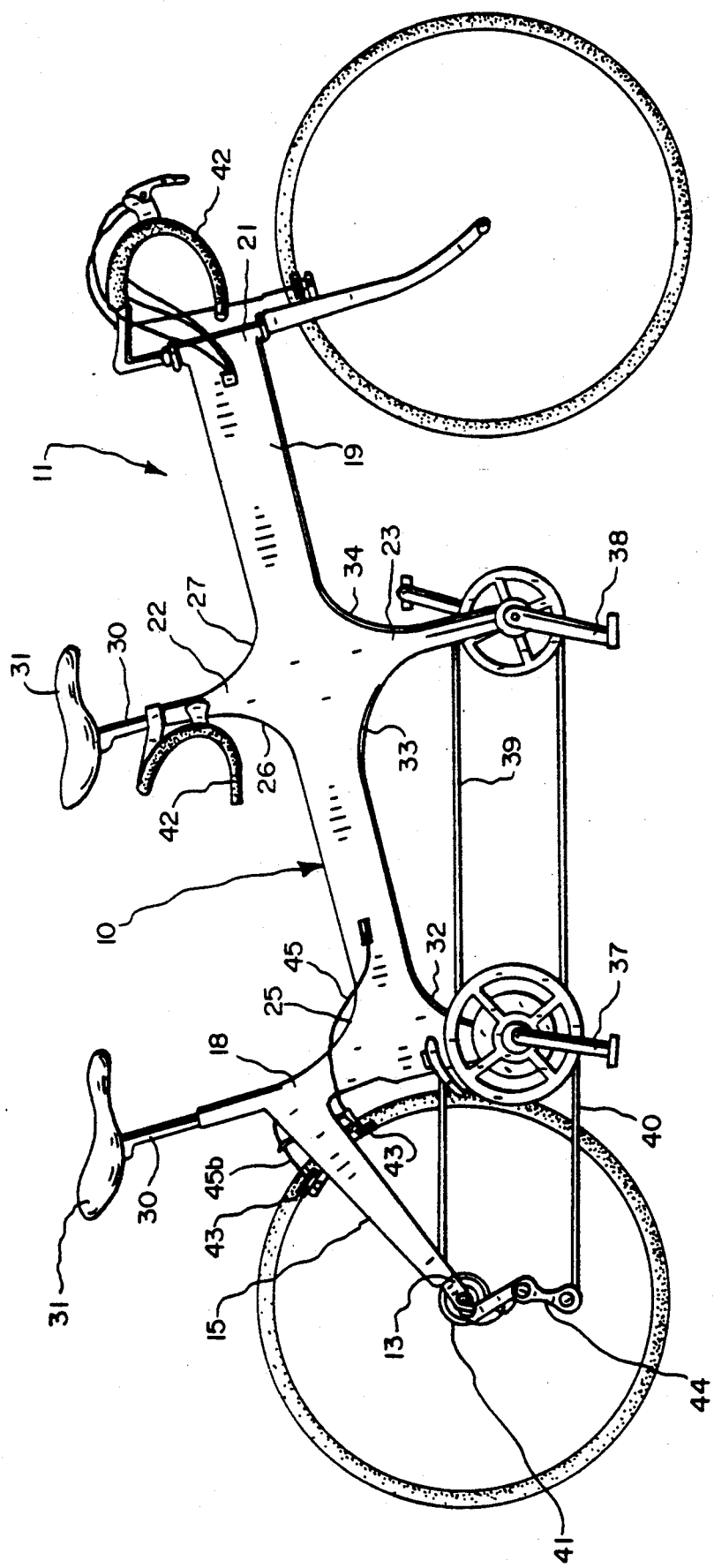
FIG. 1 is a side elevation view of a composite bicycle frame in accordance with the invention, incorporated into a two seat tandem bicycle assembly, drawn to a reduced scale, FIG. 2 an upper right perspective view of the frame of FIG. 1, drawn to a smaller scale, FIG. 3 and upper right perspective view of an innermost shell assembly of the frame of FIGS. 1 and 2, indicating the helical tape winding of the main beam shell in process along with other oriented fiber lay-ups of the outer shell in exploded relationship to the innermost shell, drawn to approximately the scale of FIG. 2, FIG. 4 an upper right perspective view of component innermost shells shown in exploded relationship prior to assembly, drawn to the scale of FIG. 3, FIG. 5 a top plan view of a fragment of the shells of FIG. 4, taken along line 5—5 thereof, showing the foremost end of the main beam innermost shell and the head tube with welded mounting plates, drawn to the scale of FIG. 4, FIG. 6 a perspective view of the male mandrel of the front seat post innermost shell, the mode of spiral wrap and fiber patch lay-up being indicated, along with the removably attached seat mounting shell, drawn to a reduced scale, larger than that of FIG. 5, FIG. 7 a perspective view of the male mandrel of the front pedal support post, with removably attached pedal hub mounting sleeve, the manner of spiral wrap and patch lay-up being indicated, drawn to the approximate scale of FIG. 6, FIG. 8 a vertical cross sectional view of a fragment of the frame of FIG. 2, showing the junction of the main beam and the front seat and pedal support posts, taken along line 8—8 of FIG. 2, drawn to a reduced scale larger than that of FIG. 2, FIG. 9 a horizontal cross sectional view of a fragment of the frame of FIG. 2, taken along line 9—9 thereof, showing the steering support sleeve and the sleeve mounting plates bonded to the main beam innermost shell and overwrapped by the frame outer layer, drawn to substantially full scale, FIG. 10 a vertical cross sectional view of a fragment of the forward pedal support post, taken along line 10—10 of FIG. 2, drawn to reduced scale, FIG. 11 a side elevation view of a frame in accordance with the invention constructed for use with a single seat bicycle, drawn to the approximate scale of FIG. 2, FIG. 12 a perspective view of a fragment of the main beam shell male mandrel, shown in conjunction with a fragment of a lay-up of fibrous material impregnated with synthethic resin with which the mandrel is wrapped prior to vacuum bag cure, drawn to a reduced scale, FIG. 13 a perspective view of the bicycle frame of FIG. 2, shown in phantom lines encased by a vacuum bag and lay-up for curing of the outer layer, drawn to a smaller scale than FIG. 2, FIG. 14 a perspective view of a fragment of the main beam innershell overlaid with the outer layer of fibrous material and encased within the vacuum bag and lay-up, the latter being indicated, drawn to the approximate scale of FIG. 12, FIG. 15 a perspective view of a fragment of the left side rear wheel stay member, drawn to a reduced scale, FIG. 16 a cross sectional view of one of the side members of one of the rear wheel stay members, taken along line 16—16 of FIG. 15, drawn to substantially full scale, FIG. 17 a vertical cross sectional view of the fragment of FIG. 8, the outermost layer however being used only at the main beam-pedal and seat post junction, drawn to the scale thereof, FIG. 18 a cutaway perspective view of a rear brake cable coupling device, drawn to approximately full scale, FIG. 19 a vertical cross sectional view of the main beam of FIG. 2, taken along 19—19 thereof, drawn to a larger scale, FIG. 20 a cross sectional view of a main beam innermost shell constructed by a lay-up cured within a split female mold pressurized by internal bladders, drawn to a reduced scale, and FIG. 21 a schematic layout of frame member cross sectional configuration choices within an allowable envelope.

In FIG. 1 is shown a generally hollow composite "Z-X-frame" 10 being utilized for a dual rider, tandem bicycle 11. A perspective view of frame 10 is shown in FIG. 2. A pair of left and right metallic rear wheel dropout plates 12 and 13 each have a slot 14 for receiving a corresponding end of the rear wheel axle of bicycle 11. (FIG. 15) The drop-out plates are each integral with one of a pair of rear stay members 15 and 16, which slope upward and forward to a junction 17 secured to an upstanding rear seat post support 18. Seat post 18 is merged into the top of the rearmost end of a gradually up-sloping main beam 19. Integral with the bottom side of the rearmost end of main beam 19 is a downstanding rear pedal support 20.

The up-sloping main beam 19 extends in a straight line from rear seat post 18 and pedal post 20 to a head post 21 at the front end of the frame. Intermediate upon the top of main beam 19 is an upstanding front seat post support 22, opposed by a downstanding front pedal support 23. Head post 21 provides an integral metallic head tube sleeve 24 for handle bar and front wheel fork attachment.

Figure 11:
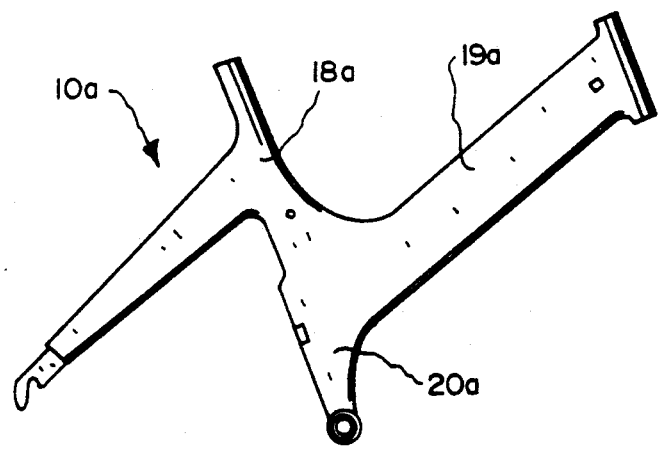

The rear seat post 18, and rear pedal support 20, when modified to accommodate a more steeply up-sloping, shorter, main beam 19a, may be used to construct a single seat "Z-frame" 10a, with seat post 18a, pedal post 20a, steering post 21a, rear stay 15a, pedal sleeve 35a and drop-out plates 13a. (FIG. 11)

Seat posts 18 and 22, pedal support posts 20 and 23, rear stay side members 15 and 16, and main beam 19 are all generally hollow. Seat posts 18 and 22 have large radiused fillets 25, 26, and 27, for increased junction cross sectional area to provide increased stiffness The outside profiles of scat posts 18 and 22 have smooth transitions to the top surface of main beam 19. The top end of each seat post 18 and 22 incorporates an integrally bonded metallic seat tube sleeve 28 and 29 respectively. (FIGS. 2 & 6) The sleeves are wrapped into the composite plastic structure of frame 10 for attachment of seat stems 30 and saddles 31. (FIG. 1)

Pedal supports 20 and 23 have large fillets 32, 33 and 34, increasing junction cross sectional area and stiffness. The outer outlines of the pedal supports 20 and 23 transition smoothly into the bottom surface of main beam 19. United to the bottommost ends of rear and front pedal supports 20 and 23 are metallic pedal axle sleeves 35 and 36 respectively. Sleeves 35 and 36 accept corresponding pedal bearing and axle assemblies of front and rear pedal assemblies 37 and 38, the latter being linked together by a chain 39. Rear right pedal axle triple or double-sprocketed pedal assembly 37 is linked via a chain 40 to the rear wheel sprocket 41. Thus, the pedal strokes of both riders are transmitted to the rear wheel. Front and rear pedal axles and sleeves are horizontal, parallel, and aligned longitudinally to the frame 10. Midpoints of the sleeves 35 and 36, the rear axle, and the axes of the seat posts and the head post all lie in a vertical plane about which frame 10 is generally laterally symmetrical.

Figure 18:
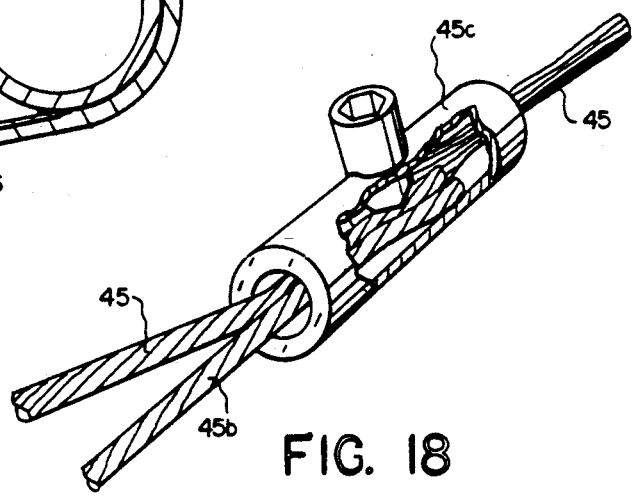
Figure 10:
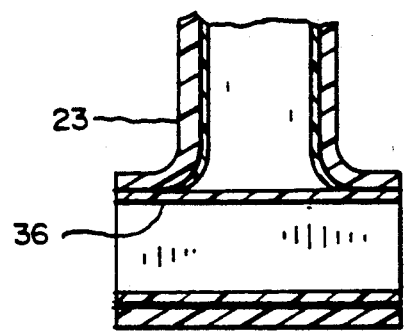

The assembled "Z-X-frame" bicycle 11 carries at least three metallic cables and guides connected to the front handlebars 42, to control a pair of rear wheel, cable actuated, brakes 43 and a chain derailleur 44. These cables are routed through one side of the front portion of hollow main beam 19, exiting at the rear thereof. Rear brake cable 45 operates both rear wheel brakes 43, being joined to a short branching cable 45b by a cable couple assembly 45c. (FIG. 18)

Figure 19:
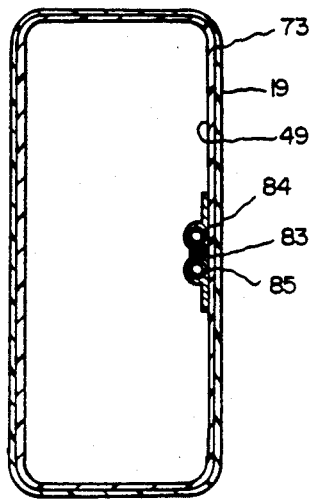

A front derailleur cable, not shown, is routed through the interior of rear pedal support 20. The rear derailleur cable, not shown, passes through the interior of the rear seat post 18 and downwardly through the hollow right rear stay member 15, exiting to be attached to the rear derailleur 44. The actuating cables are cased within a thin walled nylon tube, 83 84 and 85, which is bonded to the inside surface of the walls of the hollow frame 10, as described below. (FIG. 19)

The geometry of the "Z-X-frame" departs substantially from prior art, triangular truss, tubing frame geometry. However, the basic ergonomic design of such frames is maintained. Seat tube sleeves 28 and 29 are each installed at typical tandem bicycle geometric angles, 72° to 74° (preferably 73°) with the horizontal, as is head tube sleeve 24. Most importantly, the front and rear seat posts 18 and 22 are spaced apart 26" to 30", depending upon the torso heights of the riders.

The up-sloping angle of the rear stays 15 and 16 provides clearance for drive chain 40 vertical bounce and horizontal swing during shifting of gears. Also, between-sprocket chain jamming from chain sprocket jump-off of either of the two chains is eliminated. Wheel bases of both the "Z-X" and "Z-frames" are consistent with evolved bicycle geometry, the latter being 38" for road and 43" for mountain use, again depending upon the size of the rider's body. For the same reasons, the "Z-X-frame" wheel base is between 62" and 70". The rear axle is 15¾ to 18" (preferably 17") from the rear pedal assembly 37. Rear dropout slots 14 are near vertical for easy wheel removal and installation. The rear wheel axle position is the same for variously sized frames.

Figure 21:
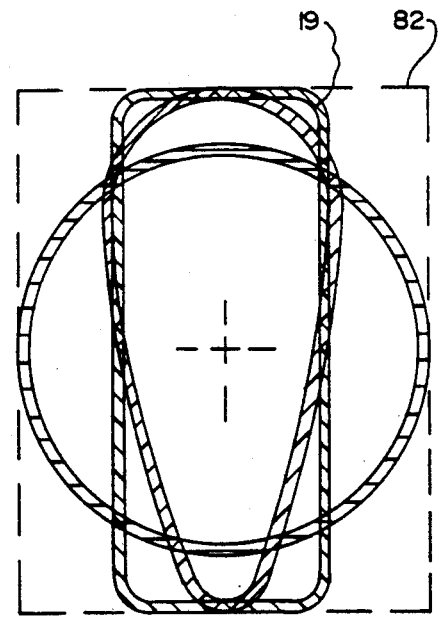

The main beam 19 in cross section is generally rectangular, and relatively deep vertically. (FIG. 19) Beam 19 is tapered longitudinally both laterally and vertically, for easy mandrel removal, as described herein below. Near its front end, beam 19 measures 4-6" vertically and 1¾-3" horizontally, (preferably 4¾ by 2"). At the rear, beam 19 measures 3¾ to 4¼" vertically and 1 to 1¼" horizontally. (preferably 4 by 1⅛"). The taper of main beam 19 provides clearance for the front derailleur and for the riders' pedalling legs. Rear and front seat post supports 18 and 22, and pedal supports 20 and 23, are also rectangular in cross section, dimensioned for consistency with adjacent main beam widths. The use of the rectangular cross section provides convenient flat outer surfaces for assembly of seat and pedal posts thereto. Also, desired compliance is easily achieved by selected composite lay-up on its top, bottom and sides. However, possibly more aerodynamic, circular, ovate or elliptical shapes may be used if desired. (FIG. 21)

Similarly, the cross sections of the two rear wheel stay members 15 and 16 are also rectangular, each tapering from front to rear. Each is 2½ to 3¼" vertically and ¾ to 1" horizontally (preferably 2⅞ by ⅞") at its front end, and tapers to 1½ to 2½" vertically and ½ to 1" horizontally (preferably 1⅞ by ¾") at its rearmost end.

As seen in exploded view FIG. 4, innershells 47 and 48 of front and rear seat posts 18 and 22 each has a lowermost rectangular cross section interfacing with the top of innermost shell 49 of main beam 19. Each seat post narrows upwardly to a circular cross section at seat tube sleeves 28 and 29. Shells 50 and 51 of pedal supports 20 and 23 interface rectangularly to beam shell 49, but taper downwardly to interface rectangularly with horizontally aligned pedal axle sleeves 35 and 36. Generally hollow front pedal support 23 is about 2.6" wide. Preferably (although it may also be hollow) rear pedal support 20 incorporates a non-expanding urethane foam core 52, selectively formed as by sanding to match dual or single seat frame main beam incline angles. Foam core 52 accepts the 1.6" diameter rear pedal axle sleeve 35, which is bonded to foam core 52 using a two-part epoxy, ambient curing, adhesive.

Figure 12:
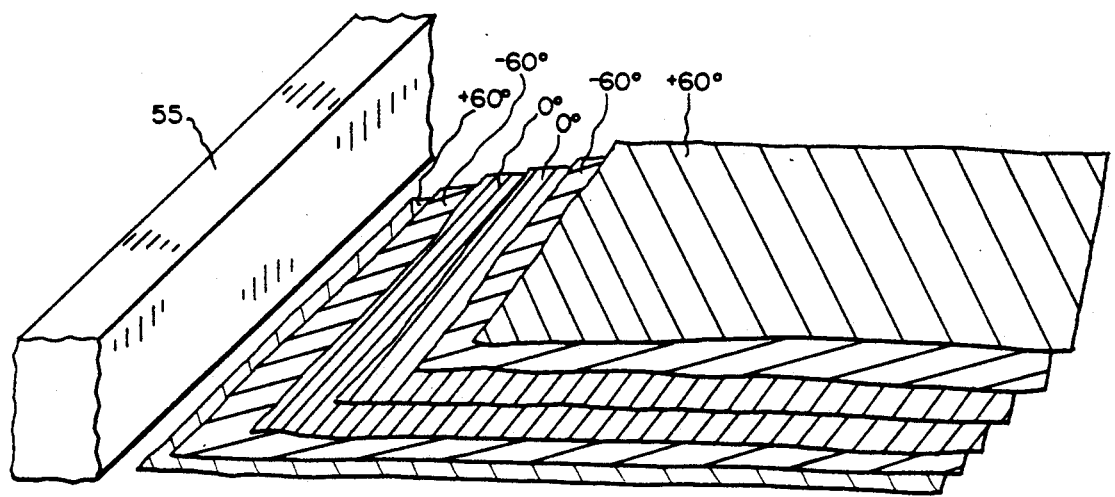

As indicated above, the "Z-X" and "Z-frames" are each fabricated in two stages each having a composite cure cycle. The first stage begins with fabrication of innershell structures for main beam 19 and for the appended seat posts and pedal support posts. (FIGS. 6 & 7) Machined metal, or hardwood, mandrels 53 and 54 are used for the front seat post and the front pedal post. Similar mandrels, not shown, are employed for the rear seat support post, the rear pedal support post and the rear stay side members. The mandrels for all of these members are overwrapped with composite to produce the inner shell of each. A tape rolling process, as indicated in FIG. 12 for main beam mandrel 55, is used to apply innershell composite layers to all the mandrels.

The composites employed are woven or non-woven fibrous material (unidirectional tape) impregnated with chemical, ultraviolet light or heat activated synthetic epoxy or polyester resin. The preferred resin content is 30 to 43% by weight. The unidirectional tape is made up of fibers on a roll continuous from beginning to end, typically 50 feet or more in length in commercially available widths between 3 and 60". The fibrous materials have a medium to high tensile modulus of between $20 \times 10^6$ to $75 \times 10^6$ psi. (preferably $30 \times 10^6$). T300 carbon fiber from Amoco Performance Products, Inc., Alpharetta, Ga., manufactured from a polyacrylonitrite (Pan) precursor is a suitable fiber, as well as Kevlar® 49, an aromatic polyamide fiber from DuPont Company, Delaware, along with Spectra, a polyethylene fiber from Allied Fibers, Petersburg, Va. Another possible fiber is S-2 glass, although its modulus is lower than $20 \times 10^6$ psi from Owens-Corning Fiberglass. The composite materials are anisotropic, so that the designer may orient the fibers to conform to stress paths in the frame.

The plyes of the layers of composite are oriented upon the mandrels to be highly interspersed to more efficiently transfer loads in the finished product. The interspersing is accomplished by varying the fiber orientations from ply to ply throughout the lay-up. This reduces interlaminar residual stresses. The main beam innershell 49 lay-up includes 8 plyes of unidirectional tape. One preferred combination of fiber orientation is +60, 90, −60, 0, 0, −60, 90, +60 for a balanced lay-up about 60 mils in thickness. The resulting cured layers of the main beam innershell 49 can alone carry a major portion of the frame loads.

Figure 13:
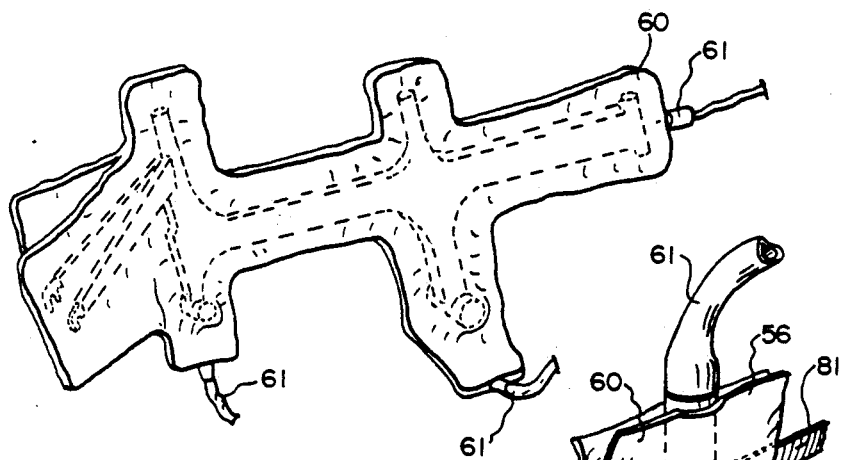
Figure 14:
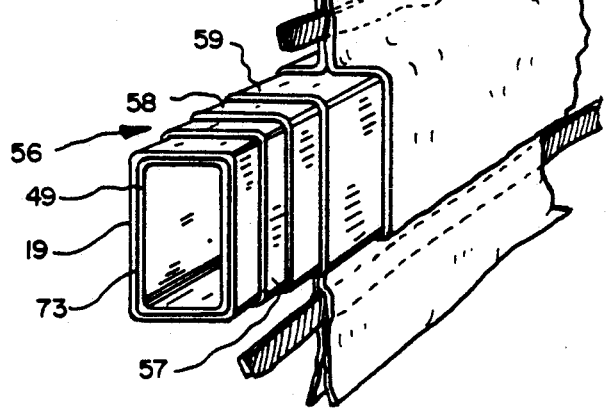

To make the main beam innershell lay-up, a 12" wide unidirectional carbon pre-impregnated tape is cut to produce fiber orientations of +/−60°, 0°, and 90°. The plyes are then laid up in the order shown in FIG. 12. Main beam mandrel 55 is then coated with mold release and rolled onto or folded into the lay-up. The uncured composites wrapped around the main beam mandrel are then encased in a vacuum bag lay-up 56 such as shown in FIGS. 13 and 14, having a peel ply 57, a separator film 58, a layer of breather cloth 59, and an elastomeric, preferably reuseable, vacuum bag 60 carrying vacuum fittings 61. Completed main beam innershell lay-up is then cured at ambient temperature or with oven heat as required for resin polymerization, with air evacuated from bag 60. Evacuation applies between 10 and 16 psi to the composite layers, without the use of a pressurized autoclave, which could provide pressure as high as 120 psi. After cure, vacuum bag 60 is removed and the tapered main beam male mandrel 55 withdrawn from the cured innershell 49. The shell is then trimmed to the desired length.

Alternately, the innershells can be made using internally pressurized female split molds 62, as is well known to those skilled in the art. (FIG. 20) Internal bladders 63 apply curing pressure to shell lay-ups 64.

Front seat and pedal support innershells 48 and 51 are similarly fabricated, using mandrels 53 and 54. (FIGS. 6 and 7) The seat support mandrel 53 carries removably attached seat tube sleeve 29 positioned flush with the mandrel surface. All of the mandrels, as previously indicated, may be constructed of hardwood, for example, but more preferably are of metal such as aluminum, commonly used for composite tooling applications. Seat tube sleeve 29, of chromium-molybdenum alloy steel or aluminum, is coated with epoxy adhesive and covered with a glass scrim cloth material, not shown, to prevent galvanic corrosion. Seat post male mandrels are coated with a Teflon based mold release agent, not shown, such as Master MC-100, from Kindt-Collins Products, Cleveland, Ohio. The seat post mandrels are then laid up with a plain weave pre-impregnated carbon cloth with three plyes at +/−45°, 0°/90°, and +/−45°, each approximately 0.030" thick, vacuum bagged and cured.

Front pedal support innershell 51 is fabricated similarly. Male mandrel 54, carrying releasably attached pedal axle sleeve 36, again with galvanic scrim cloth protection, not shown, is wrapped with similar plyes before vacuum bag cure. (FIG. 7)

After cure, the front seat and pedal support innershells are removed from respective mandrels and trimmed in preparation for the next stage of frame fabrication.

Rear pedal support innershell 50, and rear seat post shell 47 are made similarly. Or, the lightweight urethane foam mandrel 52 may be used for rear pedal support 50, and left within the completed shell lay-up after cure. The urethane foam used has a density of 2 to 6 lbs./ft.$^3$, and resists heat expansion over a cure temperature range of 200° F. to 350°F. Such foam is available through Aircraft Spruce and Specialty Company, Fullerton, Calif. This material is also used as a permanent mandrel block 65 for "V" joint 17 as later described. Both core 52 and mandrel block 65 have clearance holes, not shown, for the rear and front derailleur cables.

Rear stay side members 15 and 16 each have symmetrical rectangular cross sections. (FIG. 16) Both may be fabricated with a single male tapered mandrel, not illustrated. The dropout plates 12 and 13 are removably attached to respective rear stay mandrels, not shown, and coated with adhesive and antigalvanic glass cloth scrim. The rear stay innershell wrappings are similar to those of main beam innershell 49. (FIG. 12) Four plyes with fiber orientations of 0°, 90°, and +/−30° are used, comprised of 2" unidirectional tape cut from a 12" wide roll, totalling a thickness of about 0.040".

Commercially available steering head tube 24 of 1 to 1¼" (preferably 1⅛") diameter carries welded left and right, 0.040" thick, metal flanges 66 and 67. Flanges 66 and 67 fit tightly over the end of main beam shell 49. (FIGS. 3, 4 and 5) These metal plates transfer front fork loads directly into the walls of the composite main beam, being bonded to the main beam innershell 49 and subsequently overwrapped along with head sleeve 24 as described below.

The cured inner shells for front and rear seat and pedal supports, main beam, rear wheel stays and mandrel block, and head tube sleeve with metal mounting plates, are all bonded together in readiness for the second stage of frame fabrication. (FIGS. 3 and 4) Preferably, a high strength, synthetic adhesive is used, such as an ambient curing, two part epoxy resin EA 9309.2.NA from Hysol, a division of the Dexter Corporation, Pittsburg, Calif. A special frame assembly and alignment jig, not shown, is preferably utilized. Previously mentioned brake and derailleur cable outside nylon tubes, not shown, are also placed and bonded within the innershells, using epoxy adhesive. After the "Z-X-frame" 10 is completed, the steel brake and derailleur control cables are easily inserted through the previously installed nylon tubes.

Figure 3:
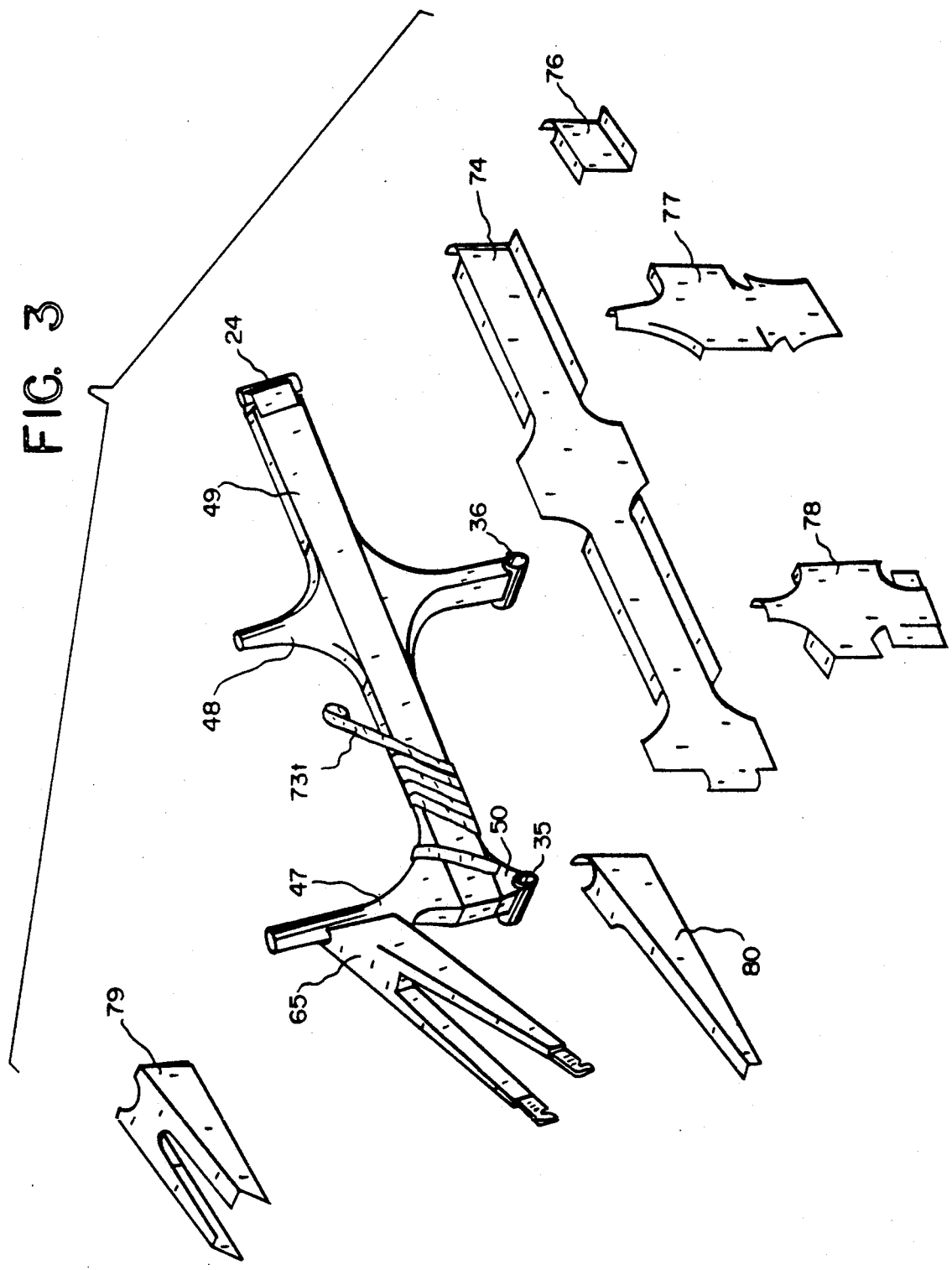

The seat and pedal support innershells are bonded to the main beam innershell with the ambient curing epoxy. The rear stay inner shells 68 and 69 are bonded to the rear side of the rear seat support innershell 47. The associated wedge shaped mandrel block 65 is bonded between the two rear stay shells 68 and 69 (FIG. 3) The complete assembled frame innershell is seen in FIG. 3. The epoxy bond material is allowed to cure, rendering the assembled shell ready for the second stage of frame fabrication.

The second stage of frame fabrication comprises lay-up of the "Z-X-frame" outside layer 73 of fibrous material impregnated with synthetic resin. This outer layer is required to provide, along with the frame innershell, sufficient frame strength and desired frame compliance. Additionally, the outer layer 73 provides stress paths for transfer of loads between the inner-shells.

FIG. 3 indicates in general the method of providing outer shell 73. A low viscosity epoxy resin, not shown, is painted onto the outside surface of the assembled innershell, assuring firm bonding of all the innershells to the outer composite layer 73.

Two inch wide unidirectional carbon tape 73t is spiral wrapped onto the assembled shell at $+30°$ for the entire length of the shells of the main beam, rear and front seat post and pedal supports, and the head tube sleeve 24. Subsequently, a $-30°$ tape ply, not shown, is used covering the entire shell over the $+30°$ ply. Next, two plyes of unidirectional tape in the form of swatches 74 cut from a 12" wide roll are applied to one side of the frame in an axial (0°) fiber angle. Identical but reversely cut swatches, not shown, are applied to the corresponding other side of the frame. The resulting lay-up of the main beam between the seat and pedal post positions may total 13 plyes at $[+60, 90, -60, 0]_s$ plus $[+30, -30, 0]_s$, and an outer ply of plain weave cloth on the outer skin for improved damage resistant toughness. Further reinforcing swatches 76, 77, 78, 79 and 80 are applied to the head tube area, front pedal and seat support areas, rear pedal and seat support areas, rear stay mandrel block area and the rear stays themselves. Various unidirectional ply angles and various swatch shapes and patterns are employed for these reinforcements. The reinforcing swatches are applied successively to each area as required by expected stress levels and directions.

Typically, the total lay-ups will, after subsequent cure, have thicknesses of 0.060 to 0.125", including those for the main beam, head tube, front pedal and seat supports, rear pedal and seat supports, rear mandrel block and rear stays. The completed outermost layer 73 comprises overlapping fibers providing substantially continuous stress paths connecting the various portions of the frame into an essentially unitary whole. This layer is in fact a monocoque structure braced and supported by the innershell.

Figure 8:
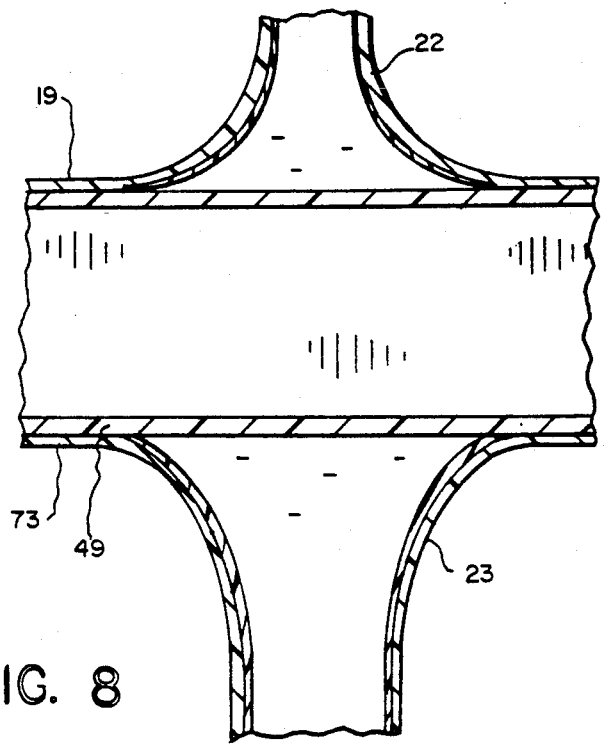
Figure 9:
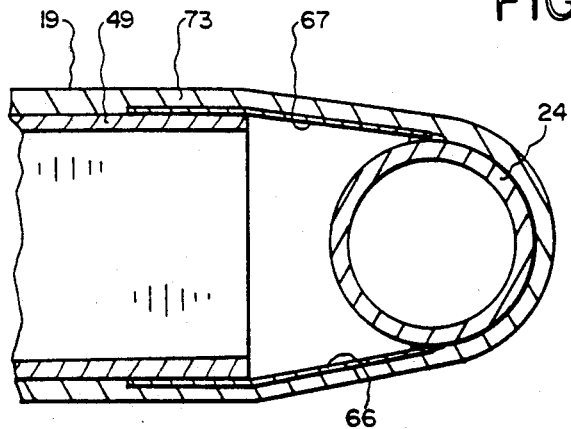

The outermost shell 73 is laid up so that, in cross section, the finished frame is everywhere symmetrical about a central vertical plane.(FIGS. 9,10,19 & 21) Symmetrical cross section are found in the main beam 19, the front seat and pedal supports 22 and 23, and in the junctions between seats and pedal supports and the main beam. (FIG. 8) However, the main beam inner shell 49 is preferably substantially heavier (thicker) than the seat and pedal support innershells, since it is designed to carry the majority of the loads subjected to the frame. The outer layer 73 additionally reinforces the main beam between pedal and seat supports. These supports, with the unifying outer layer 73, provide great flexural strength at the junctions, which are in turn stabilized and strengthened by the main beam shell extending continuously therethrough. The continuous fibers of the outer layer 73 innerconnect and span the seat and pedal supports, seat tube sleeves, and main beam efficiently, so that loads are continuously transferred efficiently between frame components. The overwrap of outer layer 73 about head sleeve 24 and connector plates 66 and 67 is shown in FIG. 9, binding these components integrally to the main beam innershell 49. The outer layer 73 at head tube sleeve 24 comprises principally continuous fibers, to transfer fork and wheel loads efficiently into the main beam. The connector plates 66 and 67, bonded to main beam inner shell 49 and integrally joined with outer layer 73, enhance efficient load transfer into main beam 19.

Pedal axle sleeves 35 and 36 are similarly integrally bonded and wrapped into the second shell, producing unitary composite outer shell structures in these areas. (FIG. 10) To reiterate, the cross sections of the final composite laminate consist of continuous fiber spanning and interconnecting the various frame units at the various junctions, in both "Z-X" and "Z frame" designs.

Upon completion of lay-up of the frame uncured outer shell 73, the entire frame is encased within a vacuum bag lay-up 56, as previously described for construction of the innermost shells. (FIGS. 13 and 14) Spirally wrapped 2" wide release coated nylon fabric tape is applied, in conjunction with patterned cut patches about the more complex contours, to produce the peel ply layer 57. Peel ply 57 prevents unwanted bonding of superimposed materials of the bag lay-up to the frame outer layer 73, functioning as a release barrier. It is tightly wrapped, and so also produces a high quality cured surface texture.

An additional release barrier 58 of Teflon ® FEP Fluorot carbon 1 mil thick film is applied over peel ply 57, to block soak-through of excessive resin into the next layer, a porous breather ply 59. Ply 59 comprises polyester (or woven figerglass cloth) matt allowing vacuum removal of entrapped air and other gases. Finally, the bagging plyes are encapsulated together within the 2 mil film, Nylon 6-6, vacuum bag 60, with the attached suction tube fittings 61. Vacuum bag 60 is sealed at its outer perimeter, and around the tube fittings 61 by a sealant tape 81. The vacuum bag material is commercially available, for example, from Airtech International, Inc., Carson, Calif.

Bag 60 is evacuated to 20 to 30" of mercury during oven heat or ambient cure of frame outside layer 73. The corresponding composite layer compaction pressure is 10 to 16 psi. The pressure differential across the bag lay-up expels the entrapped air and compresses the plyes together, resulting in a cured outer layer with 2 to 6% voids, structurally more than adequate. Upon cure completion, the entire vacuum bag and lay-up is removed and discarded, although a reuseable bag may if desired be employed.

Finally, outer shell 73 is sanded to a smooth condition, and various control cables and other hardware accouterments, not shown, added to frame 10 by bonding, riveting or the like. The completed frame 10 is then ready for finishing, as with a durable polyurethane based paint, such as Dupont "Imron".

Figure 17:
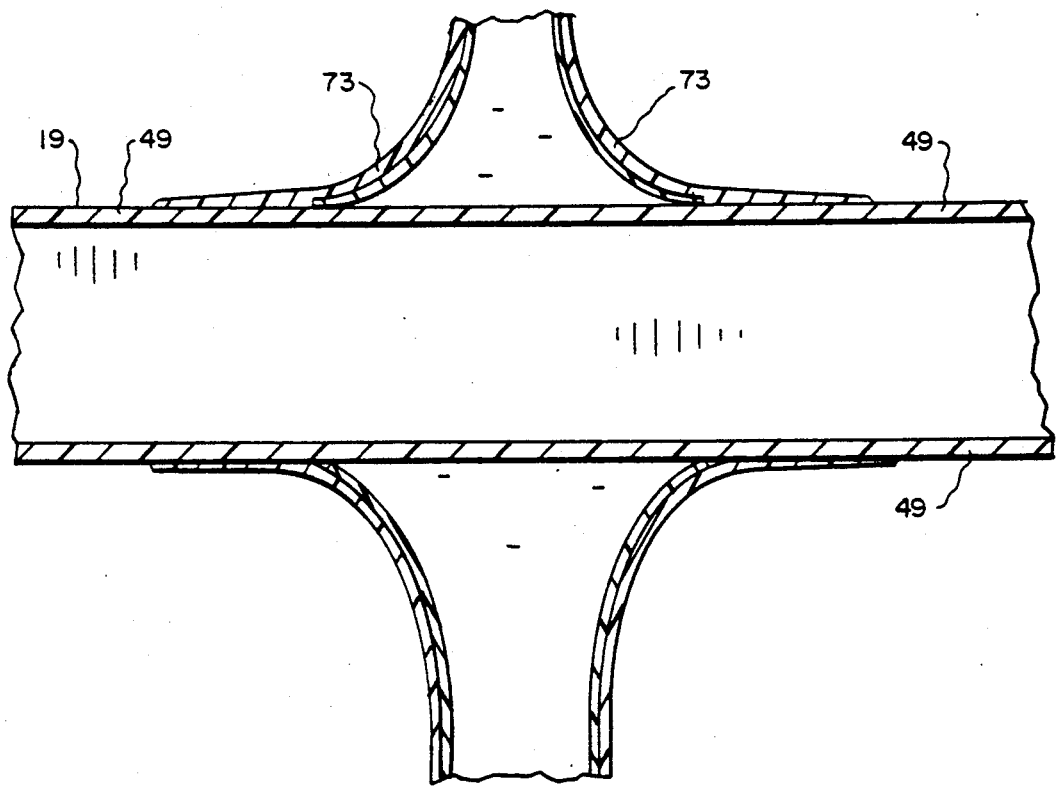

Both the above described methods of construction and the resulting structure may be varied without departing from the spirit of the invention. The main beam innermost shell 49 may be designed and constructed to itself carry the imposed loads upon portions of main beam 19 between the outer layer reinforced areas at seat, pedal, and steering post supports. (FIG. 17)

Figure 20:
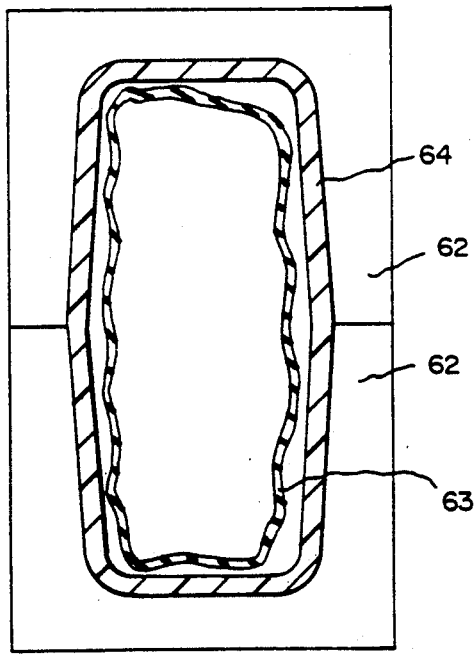

Also, the innermost shells may, if preferred, be constructed using internal pressurization bladders and external, split, female molds. (FIG. 20)

The individual frame components may vary in cross sectional shape from the generally illustrated rectangular shapes. Circular, ellipsoidal, ovate, and tear drop air foil shapes may, for example, be employed for all or selected ones of the frame component parts. See FIG. 21 for various indicated shapes which could be used within an allowable frame member envelope 82.

The inventive apparatus may be embodied in other specific forms, and the method in other specific steps, without departing from the spirit or essential characteristics thereof. The present apparatus and method are therefore to be considered illustrative and not restrictive, the scope of the invention being indicated by the appended claims rather than by the foregoing description and all changes which come within the meaning and range of equivalency of the claims are therefore intended to be embraced therein.

I claim:

1. A bicycle frame connecting a steering support means for a rotating front fork assembly, at least one seat assembly support means, at least one pedal assembly support means, and a rear wheel assembly support means, said frame comprising:
   a straight, elongate, generally hollow main beam having an innermost shell comprising layers of fibrous material impregnated with synthetic resin, said layers forming an integrated everywhere continuous wall thereof symmetrical about a vertical plane, said innermost shell having everywhere continuous top and bottom surfaces both extending continuously from the steering support means to a rearmost end of said innermost shell;
   an elongate, generally hollow, tubular seat support post having an innermost shell comprising layers of fibrous material impregnated with synthetic resin, said innermost shell being bonded to the top surface of the main beam innermost shell to upstand therefrom;
   an elongate, generally hollow, tubular pedal support post having an innermost shell comprising layers of fibrous material impregnated with synthetic resin, said innermost shell being bonded to the bottom surface of the main beam innermost shell to downstand therefrom oppositely from the seat support post innermost shell; and
   an outermost layer comprising wrappings of fibrous material impregnated with synthetic resin overlapped to integrally cover and adhere to the outside surfaces of the innermost shells of the main beam, seat support post and pedal support post to form therewith an integral, load bearing frame structure.

2. The bicycle frame of claim 1, wherein:
   the upstanding tubular seat post and the opposed downstanding tubular pedal post are at the rearmost end of the main beam, the frame further comprising:
   a rear wheel stay in a split "V" configuration secured integrally to the seat post upwardly of the main beam, and angling downwardly therefrom to connect to the axle of the rear wheel assembly.

3. The bicycle frame of claim 2, wherein the rear wheel stay comprises:
   a pair of spaced apart side members each carrying means for engaging a bicycle rear wheel axle, each side member having a hollow innermost shell bonded to the innermost shell of the tubular seat support post; wherein
   the outermost layer of wrappings of fibrous material are overlapped to also integrally cover the innermost shells of the stay side members.

4. The bicycle frame of claim 3, further comprising:
   a tubular seat post and an opposed tubular pedal post respectively upstanding and downstanding from the main beam intermediate thereto.

5. The bicycle frame of claim 3, wherein:
   a metallic head tube sleeve of the steering support means is secured to the foremost end of the main beam innermost shell and overwrapped by the outermost layer of fibrous material of the main beam.

6. The bicycle frame of claim 4, wherein:
   a metallic head tube sleeve of the steering support means is secured to the foremost end of the main beam innermost shell and overwrapped by the outermost layer of fibrous material of the main beam.

7. The bicycle frame of claim 3, wherein:
   a generally vertical metallic seat tube sleeve is secured within the uppermost end of the innermost shell of the upstanding seat post tube.

8. The bicycle frame of claim 4, wherein:
   a generally vertical metallic seat tube sleeve is secured within the uppermost end of the innermost shell of each of the upstanding seat post tubes.

9. The bicycle frame of claim 3, wherein:
   a metallic pedal hub sleeve having a horizontal axis lateral to the frame is secured to the lowermost extension of the innermost shell of the downstanding tubular pedal support post, and is overwrapped by the outermost layer of fibrous material of the pedal support post.

10. The bicycle frame of claim 4, wherein:
    a metallic pedal hub sleeve having a horizontal axis lateral to the frame is secured to the lowermost extension of each of the innermost shells of the downstanding tubular pedal support posts, and is overwrapped by the outermost layer of fibrous material of the pedal support posts.

11. The bicycle frame of claim 1, wherein:
the main beam innermost shell is itself structurally capable of carrying at least a substantial portion of the loads applied to the main beam during operation of the bicycle.

12. The bicycle frame of claim 4, wherein:
the main beam innermost shell is itself structurally capable of carrying at least a substantial portion of the loads applied to the main beam during operation of the bicycle.

13. The bicycle frame of claim 4, wherein:
the innermost shells of the frame are each structurally capable to resist the external pressure associated with vacuum bag cure of the outermost layer without structurally significant deformation of said innermost shells.

14. The bicycle frame of claim 5, wherein:
the metallic head sleeve carries a pair of mounting plates welded thereto, and said plates and sleeve are bonded to the forward end of the main beam innermost shell; and
the metallic seat tubes and the pedal hub sleeves are each bonded to the innermost shells of the tubular seat supports and the tubular pedal supports respectively.

15. The bicycle frame of claim 1, wherein:
the layers of fibrous material of the main beam innermost shell comprise at least one ply having continuous unidirectional fibers oriented longitudinally to said shell and extending the full length thereof.

16. The bicycle frame of claim 1, wherein:
the layers of fibrous material of the main beam innermost shell include at least one spirally wrapped layer selected from among a group of materials including a plus and minus helically wound fibrous roving, a braided fibrous roving, yarn and tow.

17. The bicycle frame of claim 1, wherein:
the layers of fibrous material of the main beam innermost shell include at least one ply of spirally wrapped unidirectional tape running the full length of said shell at an acute angle thereto.

18. The bicycle frame of claim 1, wherein:
the wrappings of the outermost layer includes at each junction of tubular seat support and tubular pedal support innermost shells with the main beam innermost shell at least one strip of at least four plyes including plyes laid up at a positive acute angle, a negative acute angle, a zero degree angle, and a 90° angle with respect to the longitudinal direction of the main beam.

19. The bicycle frame of claim 1, wherein:
the main beam, the rear wheel stay side members, and the tubular seat and pedal supports at their junctures with the main beam are each substantially rectangular.

20. The bicycle frame of claim 1, wherein:
selected portion of the main beam, the rear wheel stays, the pedal supports and the seat supports are each designed and constructed employing cross sectional shapes selected from a group consisting of rectangular, circular, ovate, ellipsoidal, tear drop air foil, parallelogram, and trapezoidal shapes.

21. The bicycle frame of claim 1, wherein:
the innermost shells of the tubular seat support post and the tubular pedal support post each incorporates fillets of large radii at the junctures thereof with the main beam innermost shell, providing increased frame strength and rigidity and substantially reducing stress concentrations within the finished frame.

22. The bicycle frame of claim 3, wherein the axle engaging means comprises:
a pair of metal adapter members each bonded to the innermost shell of one of the side members.

23. A bicycle frame connecting a steering support means for a rotating front fork assembly, at least one seat assembly support means, at least one pedal assembly support means, and a rear wheel assembly support means, said frame comprising:
a straight, elongate, generally hollow main beam having an innermost shell comprising layers of fibrous material impregnated with synthetic resin, said layers forming an integrated everywhere continuous wall thereof symmetrical about a vertical plane, said innermost shell having everywhere continuous top and bottom surfaces both extending continuously from the steering support means to a rearmost end of said innermost shell;
an elongate, generally hollow, tubular seat support post having an innermost shell comprising layers of fibrous material impregnated with synthetic resin, said innermost shell being bonded to the top surface of the main beam innermost shell to upstand therefrom;
an elongate, generally hollow, tubular pedal support post having an innermost shell comprising layers of fibrous material impregnated with synthetic resin, said innermost shell being bonded to the bottom surface of the main beam innermost shell to downstand therefrom oppositely from the seat support post innermost shell; and
an outermost layer comprising wrappings of fibrous material impregnated with synthetic resin overlapped to integrally cover and adhere to the outside surfaces of the innermost shells of the main beam, seat support post and pedal support post to form therewith an integral, load bearing frame structure.

24. A method of manufacture of a bicycle frame for connecting a steering support means for a rotating front fork assembly, at least one seat assembly support means, at least one pedal assembly support means, and a rear wheel assembly support means, said method comprising the steps:
providing a main beam male mandrel;
providing a male mandrel with a metallic seat tube removably attached thereto for an upstanding rear seat support post;
providing a male mandrel with a metallic pedal hub sleeve removably attached thereto, for a downstanding rear pedal support post;
overwrapping the main beam mandrel with a layer of fibrous material impregnated with synthetic resin, curing said layer using an external vacuum bag, and withdrawing the main beam mandrel from the cured main beam innermost shell;
overwrapping the rear seat support post mandrel and the attached metallic seat tube sleeve with a layer of fibrous material impregnated with synthetic resin, curing said layer using an external vacuum bag and withdrawing the mandrel leaving the metallic seat tube within the cured innermost shell;

overwrapping the rear pedal post support mandrel and the attached metallic hub sleeve with a layer of fibrous material impregnated with synthetic resin, curing said layer using an external vacuum bag, and withdrawing the mandrel leaving the metallic hub sleeve within the cured rear pedal post innermost shell;

bonding the rear seat support innermost shell and the rear pedal support post innermost shell in place upon the main beam innermost shell;

providing a metallic head tube sleeve secured to the foremost end of the main beam innermost shell;

everywhere overwrapping the assembled frame innermost shell and the metallic head tube with an outermost layer of fibrous material impregnated with synthethic resin; and curing the outermost layer using an external vacuum bag.

25. The method of manufacture of claim 24, comprising the further steps:

providing a set of rear wheel stay side member male mandrels each with a removably attached metal rear axle engaging plate, overwrapping each mandrel and a portion of each axle plate with a layer of fibrous material impregnated with synthetic resin, curing each of said layers using an external vacuum bag, and removing each male mandrel leaving each axle plate within its respective rear wheel stay member innermost shell;

bonding the forward end of each rear wheel stay member innermost shell to the rear seat post innermost shell upwardly of the main beam innermost shell;

providing a rear wheel stay mandrel block bonded to the side members and to the rear seat post innermost shell; and overwrapping the rear wheel stay member shells and the rear wheel stay mandrel block with the outermost layer of fibrous material impregnated with snythetic reson.

26. A method of manufacture of a bicycle frame for connecting a steering support means for a rotating front fork assembly, at least one seat assembly support means, at least one pedal assembly support means, and a rear wheel assembly support means, said method comprising the steps:

providing split female external molds for innermost shells of a main beam, a rear seat support post, a rear pedal support post, a front seat support post, a front pedal support post, and a pair of rear wheel stay side members;

lining each of said molds with a layer of at least one ply of fibrous material impregnated with synthetic resin;

curing each layer while applying internal pressure thereto using an inflated internal bladder; and removing each mold from about each cured innermost shell.

27. The method of manufacture of claim 26, comprising the further steps:

bonding the cured innermost shells together to form an assembled frame innermost shell;

overwrapping the outside surface of the innermost shells of the seat support post, pedal support post and at least adjacent portions of the main beam innermost shell to form an outermost layer of fibrous material impregnated with synthetic resin; and curing the outermost layers using an external vacuum bag.

* * * * *